(12) United States Patent
Zinzilieta et al.

(10) Patent No.: US 9,008,991 B2
(45) Date of Patent: Apr. 14, 2015

(54) MONITORING OF INTERACTIVE COMPUTING SYSTEM RESPONSIVENESS

(75) Inventors: Curtis Zinzilieta, Flagstaff, AZ (US); Jonathan Eric Geibel, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 582 days.

(21) Appl. No.: 13/401,810

(22) Filed: Feb. 21, 2012

(65) Prior Publication Data
US 2013/0218506 A1 Aug. 22, 2013

(51) Int. Cl.
*G06F 19/00* (2011.01)
*G06F 11/34* (2006.01)

(52) U.S. Cl.
CPC ........ *G06F 11/3466* (2013.01); *G06F 11/3409* (2013.01); *G06F 2201/81* (2013.01)

(58) Field of Classification Search
CPC ................ H04L 29/06; G06F 11/3414; G06F 17/30235; G06F 17/30902
USPC .................................. 702/108, 182–185, 188
See application file for complete search history.

(56) References Cited

U.S. PATENT DOCUMENTS

2012/0246107 A1 * 9/2012 Beaty et al. ..................... 706/52

* cited by examiner

*Primary Examiner* — Edward Raymond
(74) *Attorney, Agent, or Firm* — Patent Ingenuity, P.C.; Samuel K. Simpson

(57) ABSTRACT

An interactive response monitoring tool receives an indication that an input has been received at a computing device. Further, the interactive response monitoring tool determines if a response by the computing device to the input is slower than a predetermined response threshold. In addition, the interactive response monitoring tool determines a cause of a slowdown if the predetermined response threshold has been surpassed.

20 Claims, 4 Drawing Sheets

MONITORING OF INTERACTIVE COMPUTING SYSTEM RESPONSIVENESS

BACKGROUND

1. Field

This disclosure generally relates to the field of computer systems. More particularly, the disclosure relates to monitoring of compute resources.

2. General Background

A compute system typically utilizes a variety of compute resources. Examples of compute resources include a central processing unit ("CPU"), a memory, or the like. A user may interact with a compute system by providing an input, e.g., a keyboard entry, movement of a mouse, or the like. A response by the compute system to such interaction may involve utilization of compute resources. For example, a user may press a key on a keyboard. The compute system has to then process that input and display the keyboard input on a display screen. During such interaction, the compute system may also be utilizing compute resources for other tasks, e.g., background tasks that may not involve any user interaction. As a result of such other utilization of compute resources by the compute system, the compute system may process the response to the user interaction more slowly than if such other compute resources were not being utilized. For example, a desktop compute system may run some background processes, which consume substantial amounts of available compute resources, without being noticed by the interactive user, while other smaller loads may have a dramatic impact on the system responsiveness to the user interaction. Current approaches do not adequately monitor the responsiveness of a compute system to user interactivity.

SUMMARY

In one aspect of the disclosure, a computer program product is provided. The computer program product includes a computer readable medium having a computer readable program stored thereon. The computer readable program when executed on a computer causes the computer to receive, with an interactive response monitoring tool, an indication that an input has been received at a computing device. Further, the computer readable program when executed on the computer causes the computer to determine, with the interactive response monitoring tool, if a response by the computing device to the input is slower than a predetermined response threshold. In addition, the computer readable program when executed on the computer causes the computer to determine, with the interactive response monitoring tool, a cause of a slowdown if the predetermined response threshold has been surpassed.

In another aspect of the disclosure, a process is provided. The process receives, with an interactive response monitoring tool, an indication that an input has been received at a computing device. Further, the process determines, with the interactive response monitoring tool, if a response by the computing device to the input is slower than a predetermined response threshold. In addition, the process determines, with the interactive response monitoring tool, a cause of a slowdown if the predetermined response threshold has been surpassed.

In yet another aspect of the disclosure, a system is provided. The system includes an interactive response monitoring tool that receives an indication that an input has been received at a computing device, determines if a response by the computing device to the input is slower than a predetermined response threshold, and determines a cause of a slowdown if the predetermined response threshold has been surpassed.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

An interactive response monitoring tool configuration may be utilized to determine when an interactive session at a compute system is being impacted by other tasks and to identify those tasks. As an example, those other tasks may be utilizing compute resources that lead to a slowdown of the compute system's response to a user input. The information gathered by the interactive response monitoring tool may be provided to a higher level system that may take action to alleviate the situation.

The tasks that may run in the foreground, i.e., that the user may be aware of, may be called userspace tasks. Further, the tasks that may run in the background, i.e., system tasks that the user may not be aware of, may be called background tasks.

Figure 1:
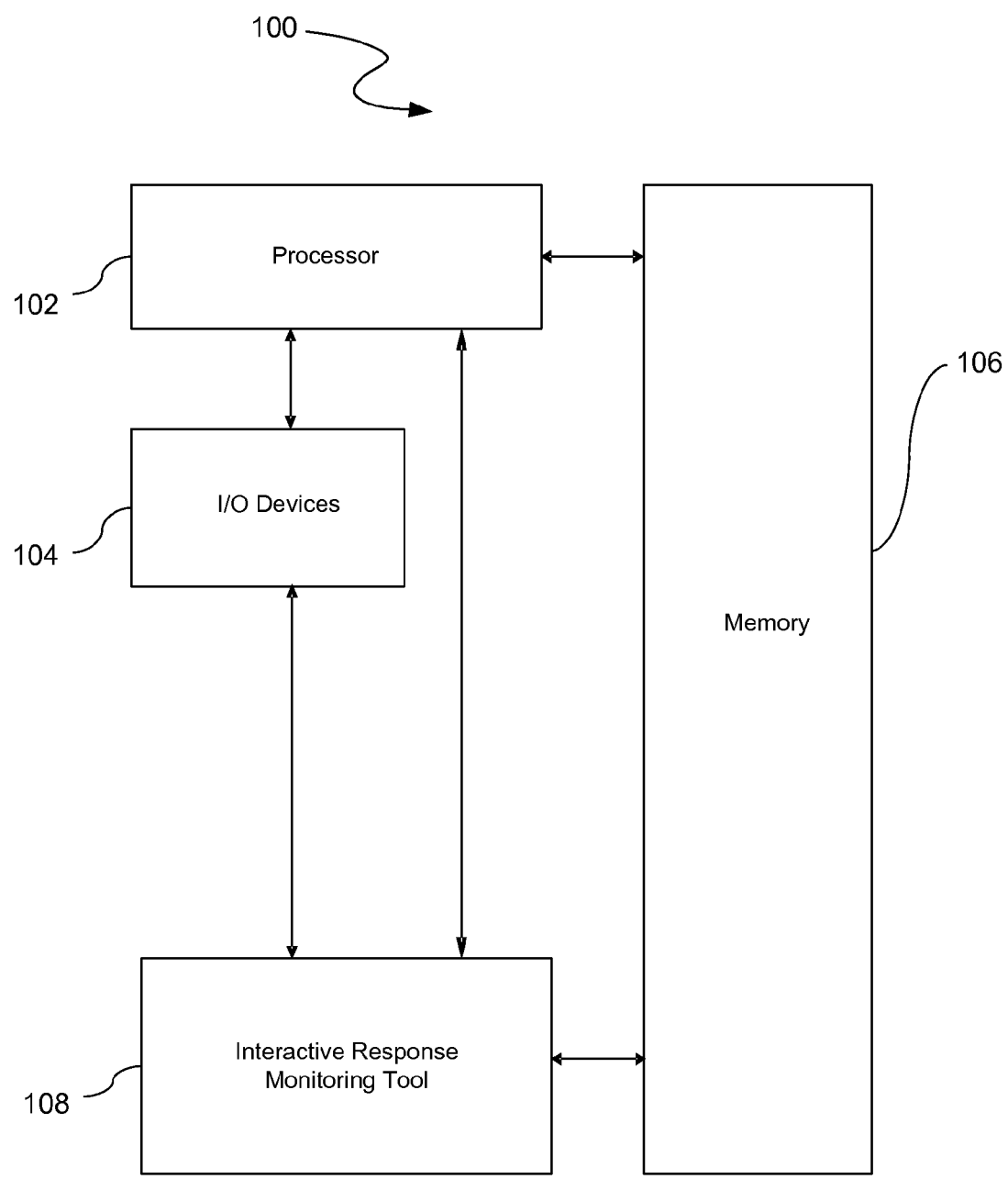
FIG. 1 illustrates a system that may be utilized to perform interactive response monitoring.

FIG. 1 illustrates a system 100 that may be utilized to perform interactive response monitoring. In one aspect, the system 100 is implemented utilizing a general purpose computer or any other hardware equivalents. Thus, the system 100 comprises a processor 102, a memory 106, e.g., random access memory ("RAM") and/or read only memory (ROM), an interactive response monitoring tool 108, and various input/output ("I/O") devices 104, (e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)). In one aspect, the interactive response monitoring tool 108 is implemented as a module. Various other configurations for the interactive response monitoring tool 108 may be utilized.

It should be understood that the interactive response monitoring tool 108 may be implemented as one or more physical devices that are coupled to the processor 102. For example, the interactive response monitoring tool 108 may include a plurality of modules. Alternatively, the interactive response monitoring tool 108 may be represented by one or more software applications (or even a combination of software and hardware, e.g., using application specific integrated circuits (ASIC)), where the software is loaded from a storage medium, (e.g., a magnetic or optical drive, diskette, or non-volatile memory) and operated by the processor 102 in the memory 106 of the system 100. As such, the interactive response monitoring tool 108 (including associated data structures) of the present disclosure may be stored on a computer readable medium, e.g., RAM memory, magnetic or optical drive or diskette and the like.

The system 100 may be utilized to implement any of the configurations herein. In another aspect, the processor 102 is (or executes) the interactive response monitoring tool 108. Accordingly, in such an aspect, an interactive response monitoring tool 108 that is separate from the processor 102 is unnecessary. FIG. 1 provides an example of an implementation of an interactive response monitor system. However, the interactive response monitoring system is not limited to any particular model and may be implemented with similar and/or different components from this example.

Figure 2:
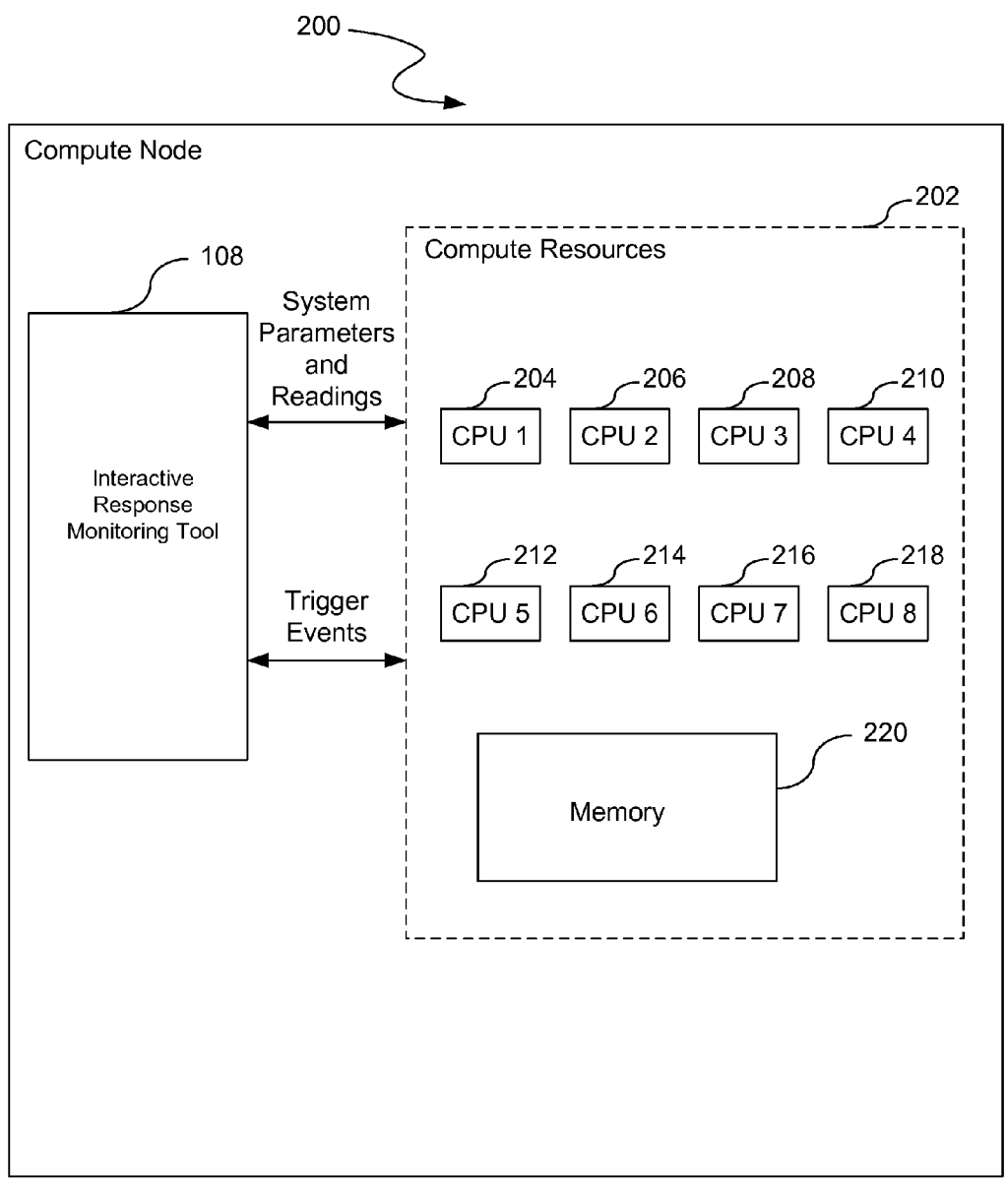
FIG. 2 illustrates an example of a compute node.

The interactive response monitoring tool 108 of the system 100 illustrated in FIG. 1 may perform interactive response monitoring for a compute node. FIG. 2 illustrates an example of a compute node 200. The compute node 200 may be a computing device, a program executed on a computing device, an operating system, a function, or the like.

The interactive response monitoring tool 108, compute node 200, and other elements described herein may be used to generate or modify an image or a sequence of images for animation. For example, the elements described herein may be used for modeling objects (shaping geometry), layout, rigging, look development, stereoscopic creation and manipulation (depth perception), animation (movement, computational dynamics), lighting, rendering, and/or color correction.

The compute node 200 may have a set of compute resources 202. For example, the set of compute resources 202 may include a plurality of CPUs such as a first CPU 204, a second CPU 206, a third CPU 208, a fourth CPU 210, a fifth CPU 212, a sixth CPU 214, a seventh CPU 216, and an eighth CPU 218. Further, the set of compute resources 202 may have a memory 220. The illustrated set of compute resources 200 is provided only as an example. The compute node 200 may have various other types and/or quantities of compute resources.

In one aspect, the interactive response monitoring tool 108 is implemented on the compute node 200. However, the interactive response monitoring tool 108 may be implemented on an external compute node that interacts with the compute node 200.

The interactive response monitoring tool 108 may act as a monitoring tool to watch system parameters and readings. As the interactive response monitoring tool 108 monitors interactivity, a variety of atypical subsystem values may be monitored. For example, the interactive response monitoring tool 108 may monitor I/O buffer queue depth, direct memory access ("DMA") region memory availability, scheduler queue depth, processor affinity for userspace processes, dirty memory reclamation status, wait state, common page coalesce and decoalesce status, or the like.

Further, the interactive response monitoring tool 108 may monitor trigger events. The trigger events may indicate an imminent increase in interactive processing requirements. In addition, the interactive response monitoring tool 108 may monitor the trigger events while monitoring code paths for timing variations that may indicate a declining interactive response. In one aspect, the trigger events occur in the userspace. Examples of such trigger events include userspace requests for additional memory allocation, userspace requests for new processes, userspace requests for additional processes, I/O wait on individual userspace processes, delays in processing signal handlers for keyboard, mouse, and other interactive devices, and/or the like. Further, in one aspect, the interactive response monitoring tool 108 performs such monitoring of the userspace proactively. As an example, the interactive response monitoring tool 108 may traverse multiple critical path routes and measure return time to further judge current interactive state. Among these traversals may be status and state for keyboard and mouse devices, time to draw known artifacts onscreen, and/or process startup/destruction.

In one aspect, the monitoring of system parameters and readings in addition to the monitoring of trigger events allows system interactive responses to be analyzed and reported. For example, details about why interactivity has been impacted may be reported to a higher level process or application so that the higher level process or application may make a decision about modifying foreground tasks, background tasks, and priorities. In yet another aspect, such decision may be performed by the interactive response monitoring tool 108.

Further, in one aspect, by monitoring a particular subset of overall system status registers and coupling the results with a set of methodologies designed to measure interactive response in a userspace such as a desktop userspace, background task priority and workload may be manipulated to ensure a continued or consistent user experience. Further, by including a dimension which tracks system load on a per-user and per-process basis, the application may also track if any interactive impact is a result of the interactive user processing, external systems or background task execution not directly associated with the user processing. Subsequent activities to change overall system load characteristics may deliver an automated programmatic response. In other words, an automated approach rather than a manual approach may be utilized to solve interactive response difficulties.

In addition, in one aspect, various tools and methodologies may be utilized to selectively poll internal system details from the operating system and to sample times to complete known critical code paths, which may result in a variety of capabilities. For example, user applications as opposed to system or other user processes may be discovered and tracked. Further, internal system parameters and metrics may be gathered and analyzed. In addition, a slowdown in an interactive environment may be determined. Any detected slowdown may be quantified to discover if the user responsiveness impacts are a result of other user actions, external systems such as network congestion, or other background system processes not directly controlled by the end user. Further, historical trends may be revised. Self-modifying vectors may then be updated and analyzed as part of the problem identification process. In addition, a report may be generated for all components or processes that may be directly impacting interactive performance. Such components or processes may include statistical probabilities for which a subsystem may be causing congestion in order to begin profiling situations which may impact user responsiveness. The current status may be delivered to higher level processes and applications in order to provide a programmatic response based on multiple dimensions of systems measurement, historical trending, and recording previous responses.

Figure 3:
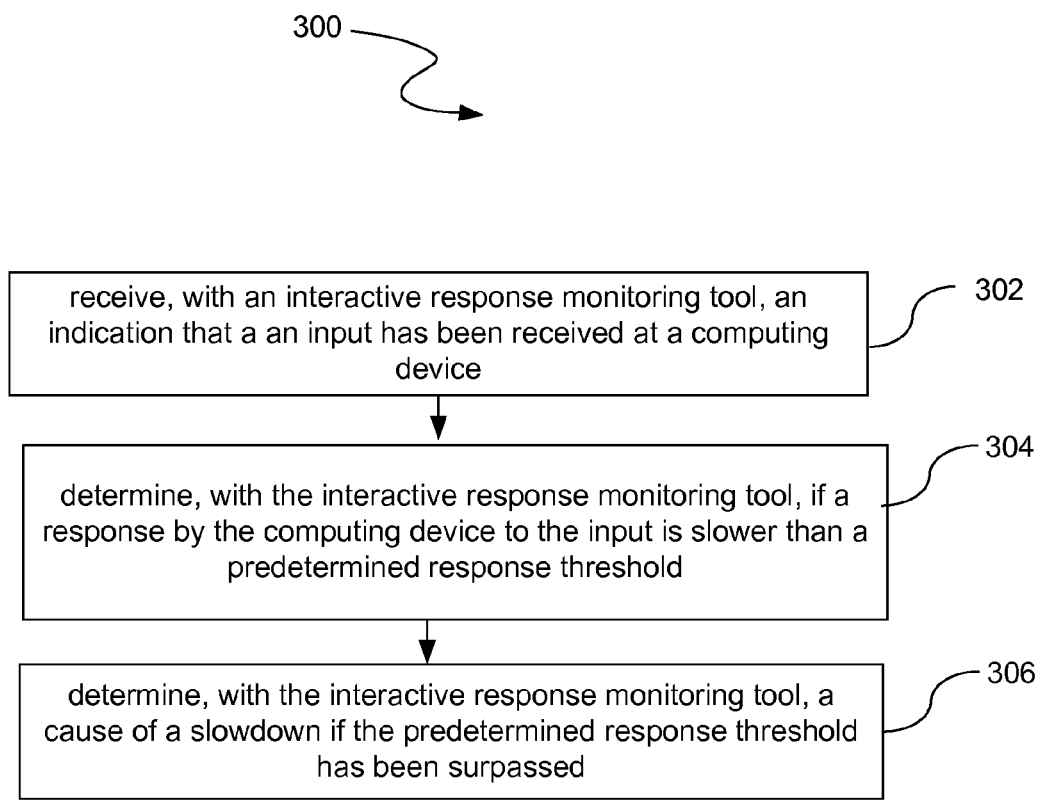
FIG. 3 illustrates a process that may be utilized to monitor interactive responsiveness.

FIG. 3 illustrates a process 300 that may be utilized to monitor interactive responsiveness. At a process block 302, the process 300 receives, with the interactive response monitoring tool 108, an indication that an input has been received at a computing device. Further, at a process block 304, the process 300 determines, with the interactive response monitoring tool 108, if a response by the computing device to the input is slower than a predetermined response threshold. As an example, the predetermined threshold may be two milliseconds. In addition, at a process block 306, the process 300 determines, with the interactive response monitoring tool 108, a cause of a slowdown if the predetermined response threshold has been surpassed.

Figure 4:
FIG. 4 illustrates an example of a report that may be generated according to the data monitored by the interactive response monitoring tool.

FIG. 4 illustrates an example of a report 400 that may be generated according to the data monitored by the interactive response monitoring tool 108. For example, the report 400 may provide an alert that indicates that interactive responsiveness has slowed down. Further, the report 400 may provide various possible reasons for the contention. For example, the reasons may include CPU contention, memory contention, network contention, file server contention, and/or local graphics processing unit ("GPU") buffer contention. Further, various probabilities may be assigned to each reason for contention. For example, the report 400 may indicate that the probability that the CPU is a reason for contention is twenty percent, the probability that the memory is the reason for contention is zero percent, the probability that the network is the reason for contention is zero percent, the probability that the file server is the reason for contention is ninety percent, and the probability that the local GPU buffer is the reason for contention is zero percent. In addition, the report 400 may indicate possible processes affecting contention. For example, the report 400 may indicate that process identifier ("PID") 54203 and PID 34244 may be processes that are affecting contention. Further, the report may indicate corresponding probabilities of contention. For example, the report 400 may indicate a ninety nine percent probability of PID 54203 affecting contention and a zero percent probability of PID 34244 affecting contention.

In one aspect, the report 400 or a part of the report 400 may be provided to the user at the compute node 200. Accordingly, the user may be informed of the possible cause of the contention. In another aspect, the report 400 or a part of the report 400 is provided to a higher level process that may programmatically utilize the data to remove the contention in an automated manner.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, or the like.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a computer readable storage device having a computer readable program stored thereon, wherein the computer readable program when executed on a computer causes the computer to:
   receive, with an interactive response monitoring tool, an indication that an input has been received at a computing device;
   determine, with the interactive response monitoring tool, if a response by the computing device to the input is slower than a predetermined response threshold;
   determine, with the interactive response monitoring tool, a cause of a slowdown if the predetermined response threshold has been surpassed; and
   generate an output of the cause of the slowdown.

2. The computer program product of claim 1, wherein the computer is further caused to monitor, with the interactive response monitoring tool, a plurality of system parameters.

3. The computer program product of claim 2, wherein the plurality of system parameters includes an input/output buffer queue depth.

4. The computer program product of claim 2, wherein the plurality of system parameters includes scheduler queue depth.

5. The computer program product of claim 2, wherein the plurality of system parameters includes memory availability.

6. The computer program product of claim 2, wherein the plurality of system parameters includes processor affinity for client processes.

7. The computer program product of claim 2, wherein the plurality of system parameters includes wait state.

8. The computer program product of claim 1, wherein the computer is further caused to monitor, with the interactive response monitoring tool, a plurality of client parameters.

9. The computer program product of claim 8, wherein the plurality of client parameters includes a trigger event that adds at least one interactive processing request and a code path that indicates a declining interactive response.

10. A method comprising:
    receiving, with an interactive response monitoring tool, an indication that a an input has been received at a computing device;
    determining, with the interactive response monitoring tool, if a response by the computing device to the input is slower than a predetermined response threshold;
    determining, with the interactive response monitoring tool, a cause of a slowdown if the predetermined response threshold has been surpassed; and
    generating an output of the cause of the slowdown.

11. The method of claim 10, further comprising monitoring, with the interactive response monitoring tool, a plurality of system parameters.

12. The method of claim 11, wherein the plurality of system parameters includes an input/output buffer queue depth.

13. The method of claim 11, wherein the plurality of system parameters includes scheduler queue depth.

14. The method of claim 11, wherein the plurality of system parameters includes memory availability.

15. The method of claim 11, wherein the plurality of system parameters includes processor affinity for client processes.

16. The method of claim 11, wherein the plurality of system parameters includes wait state.

17. A system comprising:
    an interactive response monitoring tool that receives an indication that a an input has been received at a computing device, determines if a response by the computing device to the input is slower than a predetermined response threshold, determines cause of a slowdown if the predetermined response threshold has been surpassed, and generates an output of the cause of the slowdown.

18. The system of claim 17, wherein the interactive response monitoring tool monitors a plurality of system parameters.

19. The system of claim 17, wherein the interactive response monitoring tool monitors a plurality of client parameters.

20. The system of claim 17, wherein the interactive response monitoring tool performs monitoring with a processor.

* * * * *